United States Patent [19]

Sekiguchi et al.

[11] Patent Number: 5,319,551
[45] Date of Patent: Jun. 7, 1994

[54] REGION EXTRACTING METHOD AND THREE-DIMENSIONAL DISPLAY METHOD

[75] Inventors: Hiroyuki Sekiguchi, Kawasaki; Koichi Sano, Sagamihara; Tetsuo Yokoyama, Tokyo, all of Japan

[73] Assignee: Hitachi, Ltd., Tokyo, Japan

[21] Appl. No.: 602,817

[22] Filed: Oct. 24, 1990

[30] Foreign Application Priority Data

Oct. 27, 1989 [JP] Japan .................. 1-278383

[51] Int. Cl.$^5$ .............................. G06F 15/66
[52] U.S. Cl. ................ 364/413.19; 364/413.22; 382/49
[58] Field of Search .......... 364/413.13, 413.14, 364/413.19, 413.22; 382/6, 41, 49, 48, 55

[56] References Cited

U.S. PATENT DOCUMENTS

| | | | |
|---|---|---|---|
| 4,601,055 | 7/1986 | Kent | 382/49 |
| 4,622,545 | 11/1986 | Atkinson | 340/703 |
| 4,751,643 | 6/1988 | Lorensen et al. | |
| 4,835,688 | 5/1989 | Kimura | 364/413.13 |
| 4,866,612 | 9/1989 | Takagi et al. | 364/413.22 |
| 4,882,679 | 11/1989 | Tuy et al. | 364/413.22 |
| 4,908,573 | 3/1990 | Kaufman et al. | 382/41 |
| 5,034,992 | 7/1991 | Kumagai | 382/55 |
| 5,170,347 | 12/1992 | Tuy et al. | 364/413.22 |
| 5,201,035 | 4/1993 | Stytz et al. | 395/163 |

FOREIGN PATENT DOCUMENTS 0354026 2/1990 European Pat. Off. .

OTHER PUBLICATIONS

Rhodes et al., "Three dimensional structure isolation using parallel image planes", Proceedings of the 4th Int'l. Joint Conf. on Pattern Recognition, 1978, pp. 584–591.

Levin, et al., "Surface of the Brain: 3-D Images Created with Volume Rendering", Radiology Apr., 1989, pp. 277–280.

"Digital Picture Processing", pp. 334–335.

J. Gambotto et al., "A Parallel and Hierarchical Algorithm for Region Growing", Proceedings of IEEE Computer Society Conference on Computer Vision and Pattern Recognition (CVPR '85), San Francisco, Jun. 19–23, 1985, pp. 649–652.

Primary Examiner—Roy N. Envall, Jr.
Assistant Examiner—J. L. Hazard
Attorney, Agent, or Firm—Antonelli, Terry, Stout & Kraus

[57] ABSTRACT

In order to ensure that region extraction for extracting a specified internal organ can be effected with high reliability, a region expansion method is applied by using a combination of an expansion condition taking the local density change into consideration and an expansion condition taking the global density change into consideration.

14 Claims, 9 Drawing Sheets

REGION EXTRACTING METHOD AND THREE-DIMENSIONAL DISPLAY METHOD

BACKGROUND OF THE INVENTION

The present invention relates to a method of automatically performing, for individual internal organs, a region extraction processing (hereinafter the region extraction processing for individual internal organs will be referred to as "internal organ extraction") needed as Pre-processing when each internal organ is displayed three-dimensionally by using in-body image data, especially, a tomography image which is imaged three-dimensionally.

In order to display a specified internal organ three-dimensionally, the internal organ must first be extracted from image data. However, any method of performing the internal organ extraction automatically has not been established yet and for accurate extraction, a contour of the internal organ must be inputted manually for each slice image. However, the amount of three-dimensional data is very large and therefore, in the clinical setting requiring real time performance, the manual internal organ extraction is unpractical.

Two approaches to the general method for region extraction have been contrived including:

(1) A method of tracking the contour of a region of interest (hereinafter abbreviated as an ROI)

(2) A method of Performing the region expansion by starting from a point inside an ROI.

The method in item (1) above is for automatically tracking the contour of an internal organ by looking up a local density difference of an image and has hitherto been used widely in the medical image processing. An example of this method is discussed in *Radiology*, Vol. 171, No. 1, April 1989, pp. 277-280. This type of method of tracking one line is however, liable to be fatally affected by noise and artifacts, facing a problem of impairment of reliability. In addition, the method is carried out by merely processing the slice sheet by sheet and fails to effectively utilize data of three-dimensional structure.

The method in item (2) above is for extracting an ROI by first selecting a certain point inside the ROI, retrieving a point connecting to the selected point from adjoining pixels, and taking in the connected point to expand the ROI. In general, this method is called region growing and referred to in *Digital Picture Processing* by Azriel Rosenfeld, pp. 334-335. Typically used as the condition for deciding the connection (hereinafter referred to as the expansion condition) is the difference between average density over the entire region and density of a tracking point. The prior art method finds many applications to, for example, character pattern extraction but is difficult to apply to the internal organ extraction because good results can not be obtained when the method is applied by simply using the above condition for medical images having sophisticated forms and density changes.

SUMMARY OF THE INVENTION

An object of the invention is to achieve the internal organ extraction of sufficiently high reliability which can automate the region extraction processing as far as possible by effectively utilizing data of three-dimensional structure.

In a method according to the present invention, with the view of effectively utilizing the three-dimensional data, the method based on the region expansion in item (2) above is used as a basic technique. In this case, as described previously it is a matter of importance how the expansion condition for accurately determining a region range can be set. According to the present invention, two different conditions, of which one takes local density changes into consideration and the other takes global density changes into consideration, are considered as the expansion condition and used in combination to realize the region extraction of higher reliability. Further, an expedient is taken in which the results of region extraction are added with regions adjacent to the boundary of an extracted region to minimize the oversight of extraction.

DESCRIPTION OF THE PREFERRED EMBODIMENTS

Prior to describing specific embodiments of the invention, the principle thereof will be described, that is, the region expansion taking the local density change into consideration will first be described. Normally, the density value changes greatly at the boundary of an internal organ. The principle on which the region extraction using the local density change as the constraint condition for the region expansion is based is to recognize a change in density value at the boundary so as to perform the region extraction. Specifically, when the change in density value at the boundary exceeds a constant value $\alpha$, the region expansion is stopped. On the assumption that the local region is confined within a range of one dot, the condition for permitting the region expansion is expressed by the following formula:

$$|f_i - f_{i-1}| < \alpha \quad (1)$$

where $f_i$ is a density value at an expanded region point i, and $f_{i-1}$ is a density value at a point which is one point before the expanded region point i.

However, it is infrequent that the boundary is confined within the narrow range of one dot, and normally the boundary lies over a range of several dots. In such a case, the confinement of the local region within the range of one dot is considered to be practically unsatisfactory and the following formula, i.e., an expansion of the aforementioned formula, is used:

$$|f_i - f_{i-n}| < \alpha_n \quad n = 1, 2, \ldots, N \qquad (2)$$

where N is the number of dots defining the vicinity, $f_{i-n}$ is a density value at a coordinate point which lies on the region expansion path and n dots before the expanded region point, and $\alpha_n$ is a criterion of the expansion condition which is set between two dots having an interval of n dots.

Criteria $\alpha_1, \alpha_2, \ldots, \alpha_N$ are so set as to satisfy the following formula:

$$\alpha_1 \leq \alpha_2 \leq \ldots \leq \alpha_N \qquad (3)$$

When only the local density change is used as the expansion condition, a problem arises if the boundary of an internal organ is not clear. If in such an event the expansion condition is relieved, not only an adjacent internal organ but also the background tends to be contained in an extracted region.

Now, the region expansion taking the global density change into account will be described.

In this method, the operator first surveys the entire image in order to designate a representative point of an extraction region. Then extraction is carried out by looking up a density to at the representative point (or vicinity average), a density $f_i$ at an expanding point and a preset parameter $\beta$ under the constraint condition for region expansion defined by the following formula:

$$|f_i - f_0| < \beta \qquad (4)$$

This method presupposes that the density is substantially the same throughout the interior of a single internal organ. However, the validity of this presupposition is limited to recognition of bones and soft parts or tissues in X-ray CT imaging, and in the case of MRI, a change in composition is sensitively reflected even in the same soft part or tissue and therefore it is difficult to achieve proper region extraction under only the above expansion condition.

As described above, achievement of satisfactory region extraction is not expected by the exclusive use of either of the two methods. But the two methods may be used in combination for extraction so that the two can be carried out so as to mutually compensate for their disadvantages, thereby permitting more accurate region extraction.

In the combined method, the expansion condition is defined by weighting the expansion conditions in the two methods and is expressed by the following formula:

$$a \times |f_i - f_{i-1}| + b \times |f_i - f_0| < \gamma \qquad (5)$$

where a and b are weights and $\gamma$ is the composite intensity of expansion condition.

Finally, the results of the region expansion conducted under the above condition may be added with a region adjacent to the region boundary to attain the effect to be described below.

For example, in medical images, the boundary of an internal organ is usually blurred so it can not be identified definitely as either the interior or the exterior of the internal organ. If definitely identified, large errors will be contained in data representative of the boundary of the region. Since the three-dimensional display of an internal organ is eventually done in terms of a form of the surface of the internal organ (i.e., a region boundary), it is necessary to contrive how to suppress the errors to a minimum.

According to the invention, the region extraction is first carried out through the aforementioned region expansion and thereafter a slight amount of regions subject to smoothing are added to an extracted region in order that the entirety of an internal organ to be displayed can be confined completely within the extraction region. This method may presumably have a disadvantage that regions outside the object region may possibly be included in the extraction region but the advantage of perfect inclusion of regions to be extracted can overcome the disadvantage. Especially in the three-dimensional display based on volume rendering, a portion of low density is reflected on an image and therefore the image quality greatly changes depending on whether this low-density region is included or not.

The invention will now be described using specific embodiments with reference to the figures.

Figure 1:
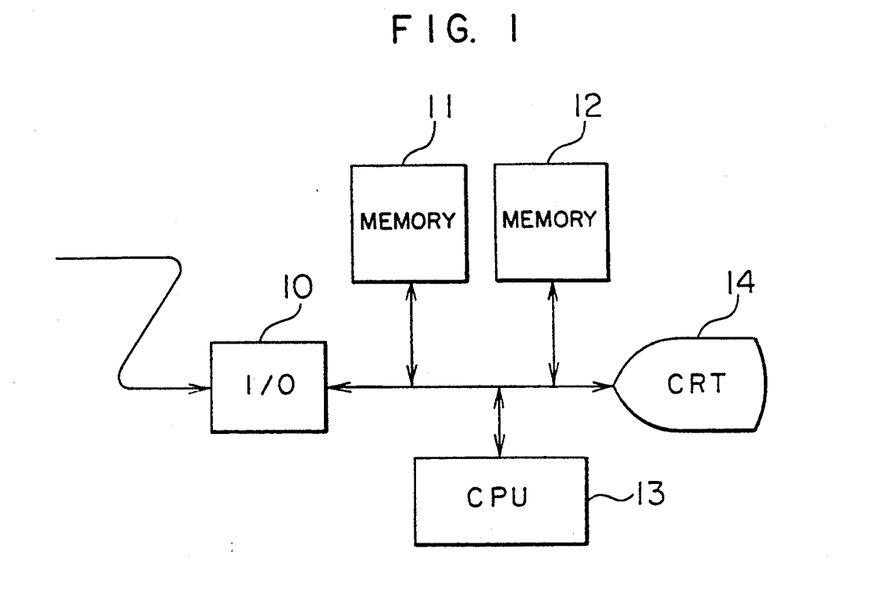
FIG. 1 is a schematic block diagram illustrating a system to which the invention is applied.

FIG. 1 is a block diagram showing a system to which the invention is applied.

Referring to FIG. 1, an input/output I/O unit 10 exchanges images between a tomography imaging system such as an X-ray CT or MRI and memories 11, 12.

Figures 2A, 2B:
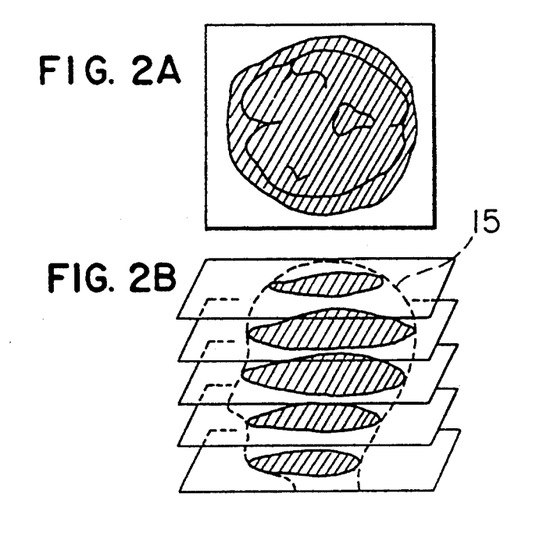
FIG. 2A is a diagram showing an MRI slice image.
FIG. 2B is a diagram showing three-dimensional data constructed from a plurality of MRI slice images of the type shown in FIG. 2A.

The memory 11 stores tomography images received from the I/O unit 10. At that time, the tomography images are stacked on each other while being held in correct spatial relationship, to obtain three-dimensional data which is stored. FIGS. 2A and 2B show the concept of this procedure. More particularly tomography images, one of which is illustrated in FIG. 2A, are stacked, sheet by sheet in the orderly manner as shown in FIG. 2B to provide a three-dimensional structure of a head (for example, the epidermis indicated at dotted line 15 in FIG.

Stored in the memory 12 are the results of region extraction obtained for an original image in the memory 11.

Under the control of a central processing unit (CPU) 13, the region extraction is first carried out for data in the memory 11, the results of extraction are stored in the memory 12, and a three-dimensional image of a specified region is prepared using the data in the memories 11 and 12.

A display unit (CRT) 14 displays the three-dimensional image prepared under the direction of the CPU 13. The CRT is also used to check the original data and the region extraction procedure.

Figure 3:
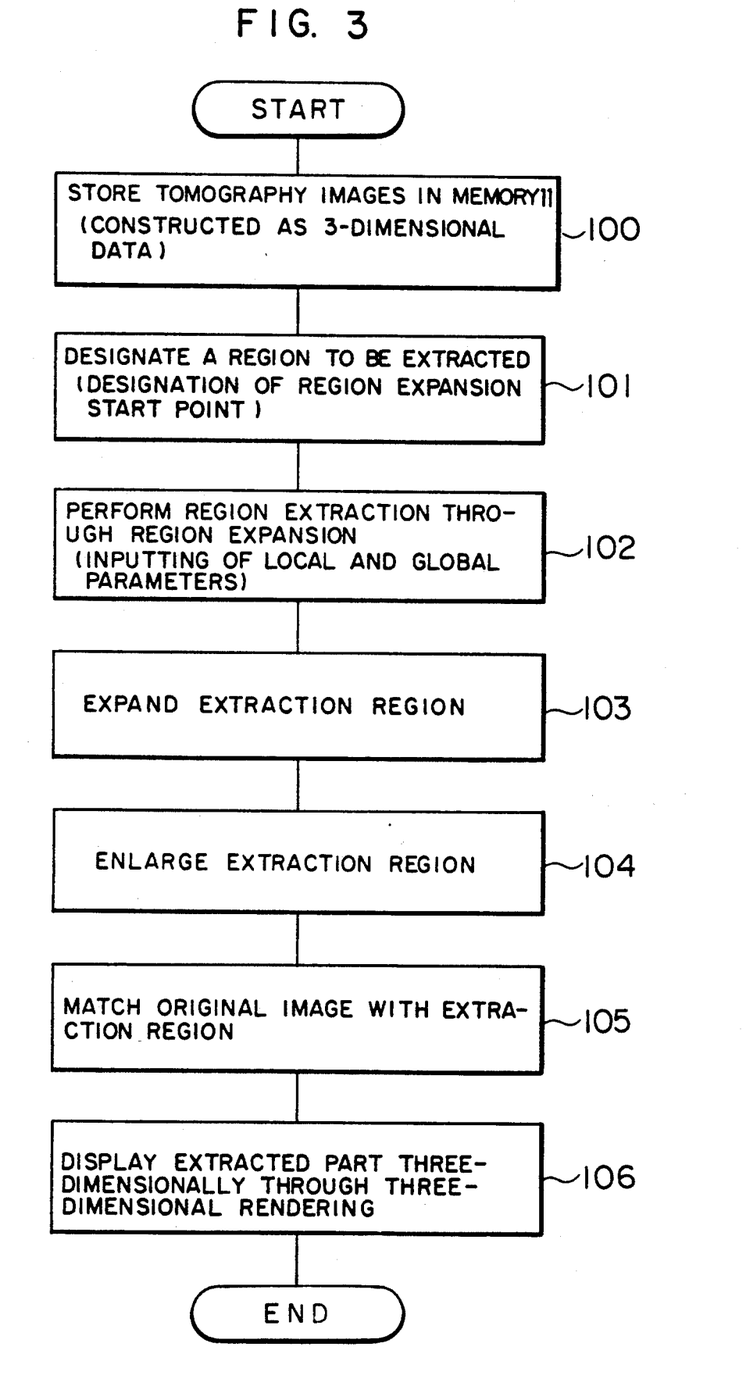
FIG. 3 is a flow chart for implementation of an embodiment of the invention.

FIG. 3 is a flow chart showing the processing procedure in the CPU 13. The procedure for extracting a cerebral cortex region by using an MRI image of a head will be described in accordance with the flow chart of FIG. 3.

Step 100

A plurality of tomography data sheets obtained from MRI are inputted through the I/O unit 10 and stacked in the memory 11. As a result, the data in the memory 11 has a three-dimensional structure.

Step 101

Looking up individual tomography images of the 3-D data stacked in the memory 11, the operator designates coordinates of a point (single or plural) inside an internal organ to be extracted. The thus designated point is a start point of region expansion (hereinafter this point will be referred to as "start point" and the region expansion will be described by referring to the following steps 103 and 111 to 122).

In the above, the start point is manually set but it may be set automatically by acquiring in advance information concerning approximate position, form or shape and density of each internal organ and conducting comparative calculation between the information and features of each internal organ in the original image.

Step 102

In the present region extraction method, the region expansion is limited by the magnitudes of local and global density changes. The intensity of the constraint condition is determined by two kinds of parameters inputted in this step, that is, a local parameter corresponding to the local density change and a global parameter corresponding to the global density change. The smaller the value of any of these parameters, the stricter the condition for region expansion becomes.

Whether the parameters are optimum or not is evaluated after completion of a practical extraction processing by displaying some sequential slices simultaneously or by actually preparing a three-dimensional image from the results of extraction. In the event that the extraction ends midway or the extraction goes beyond a region to be extracted, the local parameter or the global parameter is changed and thereafter the extraction processing resumes.

Step 103

Figure 4A:
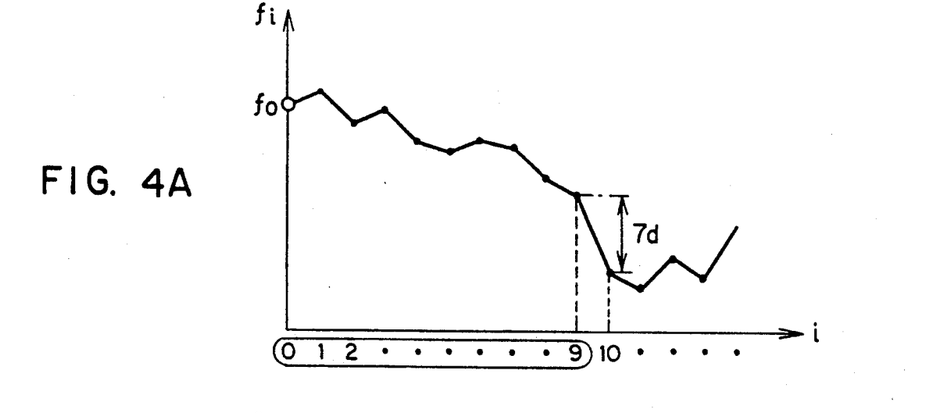
FIGS. 4A to 4C are graphs useful to explain the limitation to region expansion due to local and global density changes.
Figure 4B:
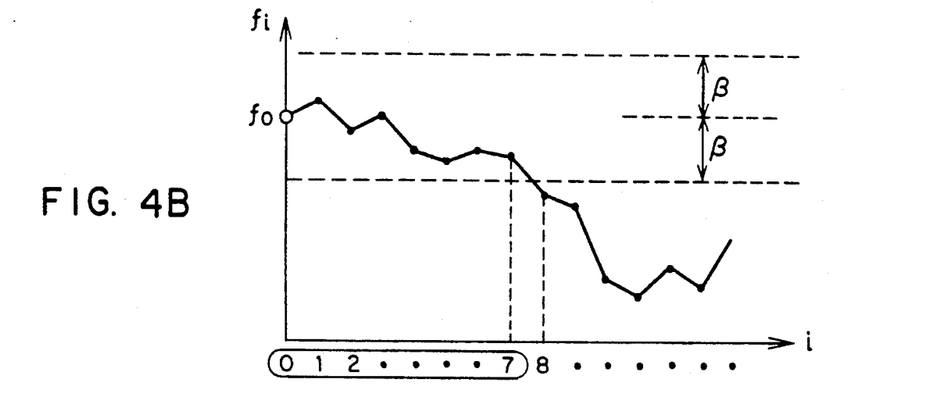
Figure 4C:
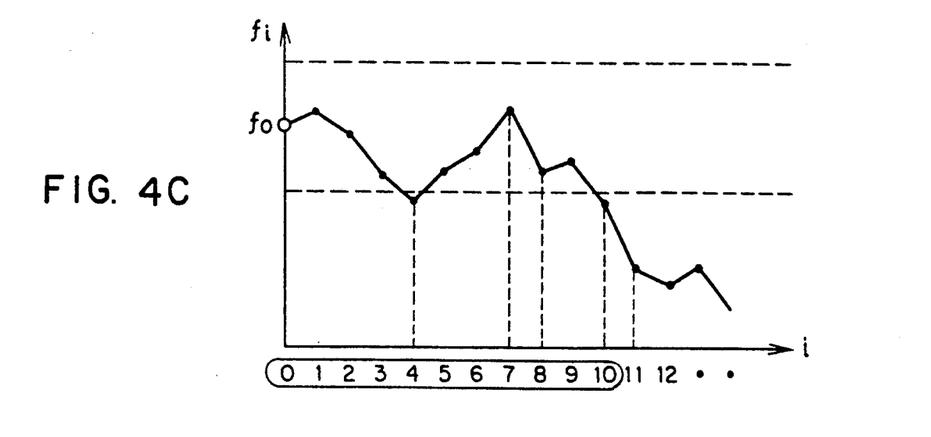

The region extraction beginning with the start point designated in step 101 is carried out by using the local and global parameters inputted in step 102 as the constraint condition for region expansion. FIGS. 4A to 4C show how the region expansion is limited by these parameters.

FIG. 4A is a graph useful to explain the region expansion limitation due to local density change.

For convenience of explanation, the region expansion is so limited as to be conducted in a one-dimensional direction.

Referring to FIG. 4A, the density changes greatly between a 9-th point (hereinafter represented by "P9") and P10 on the abscissa. Since this large density change is considered to occur at the boundary of an internal organ, the region extension is stopped at P9 and the extraction region is determined as extending from P0 to P9.

When the region expansion is carried out under the above condition the following formula stands:

$$|f_i - f_{i-1}| < \alpha$$

where $f_i$ is a density value at an expanded point, $f_{i-1}$ is a density value at a point which is one point before the expanded point and $\alpha$ is a local parameter.

FIG. 4B is a graph useful to explain the region expansion limitation due to global density change.

In FIG. 4B, the density difference referenced to the start point exceeds a preset value $\beta$ at P8. Normally, since the pixel value (the density value of a pixel) inside an internal organ is considered to fall within a certain range of density, the region expansion is stopped at P7 which is within the range and the extraction region is determined as extending from P0 to P7.

When the region expansion is carried out under the above condition, the following formula stands:

$$|f_i - f_0| < \beta$$

where $f_0$ is a density value at the start point and $\beta$ is a global parameter.

FIG. 4C is a graph useful to explain the region expansion condition defined by using the local and global density changes in combination.

Referring to FIG. 4C, the density difference referenced to the start point exceeds a preset range at P4. However, a local density change preceding P4 is not so large that the region expansion is permitted to continue. Conversely, the local density changes greatly between P7 and P8 in FIG. 4C but the density difference referenced to the start point is sufficiently small at P8, with the result that the region expansion is still permitted to continue. The local and global density differences are both large in association with P10 and the region expansion is stopped at P10.

As described above, with the local and global density changes used in combination, even when one of the two changes slightly exceeds the range of expansion condition, the region expansion is permitted to continue if the other satisfies the expansion condition sufficiently. Therefore, the region expansion can be effected with higher flexibility. The condition for this region expansion is expressed by the following formula:

$$a \times |f_i - f_{i-1}| + b \times |f_i - f_0| < c$$

where a and b are weights applied to the expansion conditions of the local and global density changes, and c is the composite intensity of constraint on the composite expansion condition.

The region expansion will be described in greater detail by referring to steps 111 to 122.

Step 104

In order that the entire region to be displayed can be included in the extraction region, the results of region extraction obtained in step 103 are added with a region corresponding to several dots.

Figure 5A:
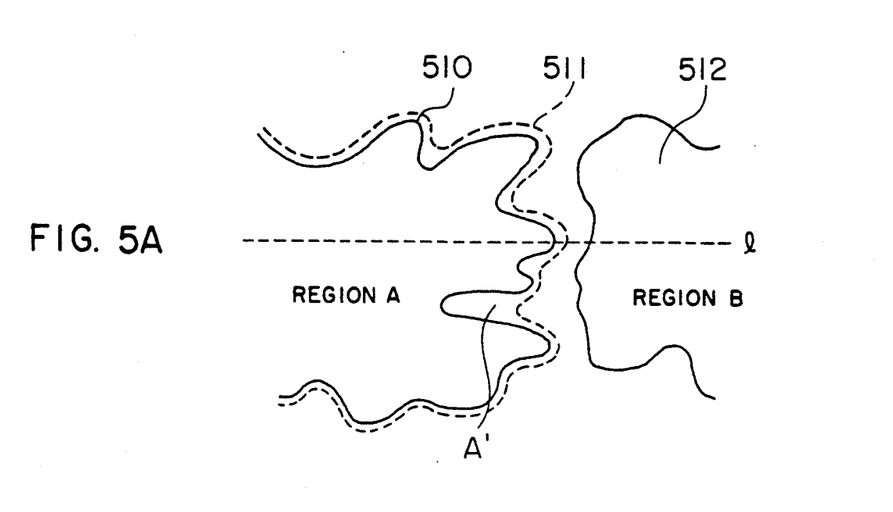
FIGS. 5A and 5B are diagrammatic representations useful to explain the region expansion processing conducted after the region extraction.
Figure 5B:
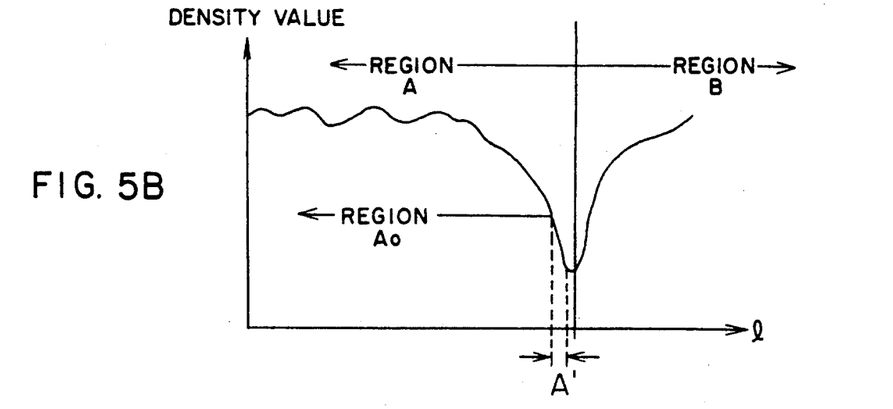

FIGS. 5A and 5B are diagrammatic representations useful in explaining the enlargement processing.

In particular, FIG. 5A depicts two adjoining regions A and B, the latter being designated by 512, and FIG. 5B graphically shows a density profile taken on line 1 of FIG. 5A. The procedure will be described on the assumption that the region A is an object to be extracted.

Of the region A shown in FIG. 5A, a region $A_0$ contoured by solid curve 510 is the region extracted in the procedure of steps 100 to 103. As will be seen from FIG. 5B, the region $A_0$ intrudes greatly into the region A to be extracted. However, for complete inclusion of the entirety of the region A, the extraction range must be extended to a portion of considerably low density value and to this end, the expansion condition has to be relieved to a great extent. In this case, however, the extraction region will extend inconveniently, reaching a different region or the background. In the present step of region adding processing, a region A' surrounding A₀ and having a dotted contour 511 is added to the extracted region to approximate the extraction region to the region A more closely. Essentially, the region A' is a mere region of low density but the presence or absence of this region plays an important role in improving the quality of three-dimensional image to be prepared through volume rendering.

The above region adding processing can be effected by, for example, applying a smoothing processing to the extracted region as indicated by the following formulas.

More particularly, the image obtained through the steps 100 to 103 is a binary image ($g_0(x, y, z)$) which is "1" inside the region and "0" outside the region but when this binary image is applied with the smoothing processing, the extraction image data is represented by a multi-value image ($g_1(x, y, z)$) which takes a value of 0 (zero) to 1 in the vicinity of the boundary.

$$g_1(x, y, z) = 1$$
when $g_0(x, y, z) = 1$ (inside the region)

$$g_1(x, y, z) = \frac{1}{27} \sum_{\Delta x=-1}^{+1} \sum_{\Delta y=-1}^{+1} \sum_{\Delta z=-1}^{+1} g_0(x + \Delta x, y + \Delta y, z + \Delta z)$$
when $g_0(x, y, z) = 0$ (outside the region)

Step 105

Individual pixels of the extraction image data obtained through the steps 100 to 104 are multiplied by individual pixels of the original image data to provide an image indicative of only a specified region extracted from the original image.

Step 106

The extraction image obtained in the preceding step is subjected to the three-dimensional display processing (rendering) to provide a three-dimensional image of a specified internal organ.

Figure 6:
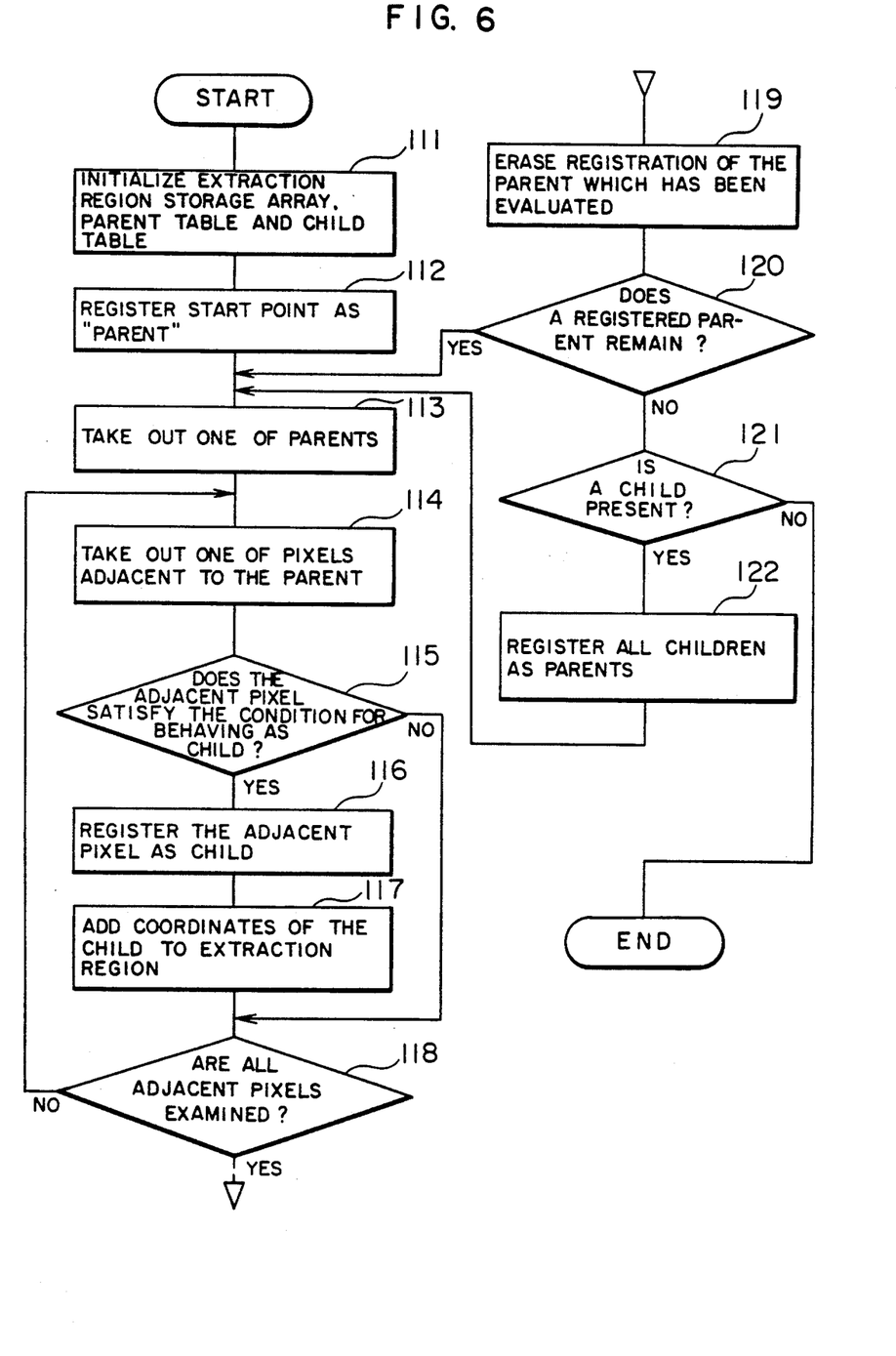
FIG. 6 is a detailed flow chart of the region expansion processing.

The procedure of region expansion processing in the step 103 will now be described in greater detail with reference to a flow chart of FIG. 6. In describing the region expansion, the original or start point of expansion will be hereinafter called a "parent" and a point expanded from the original point will be called a "child". FIGS. 8 and 8A to 8E show in sequence how "parent" and "child" take place on a practical image and how a region is expanded.

Step 111

The memory for storage of the extraction region (memory 12 in FIG. 1) and "parent table" and "child table" for storing coordinates of "parent" and "child" are initialized. The tables are stored in the main memory within the CPU 13.

Step 112

The "start point" inputted in step 102 is registered as an initial "parent" in the "parent table".

Step 113

One of the "parents" registered in the parent table is taken out and the following steps 114 to 118 are carried out.

Step 114

One of pixels adjacent to the "parent" (taken out in the preceding step 113 is taken out and the following steps 115 to 117 are carried out.

Figure 7A:
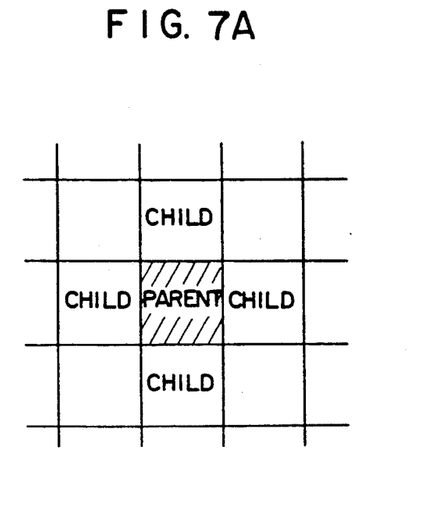
FIGS. 7A and 7B are diagrams illustrating pixels adjacent to a "parent" which can be permitted to behave as "children" upon region expansion.
Figure 7B:
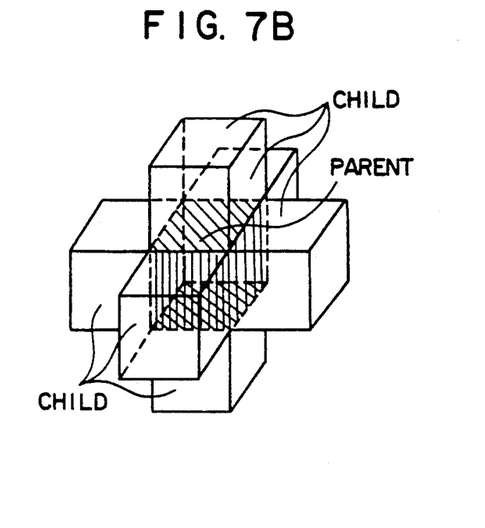
Figure 8:
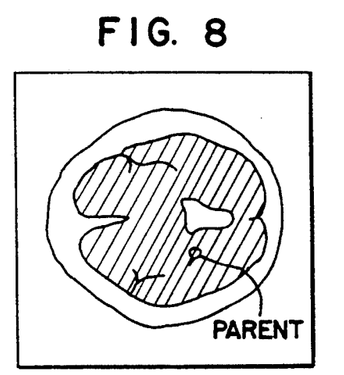
FIGS. 8 and 8A to 8E are diagrams showing how the region expansion is carried out.
Figure 8A:
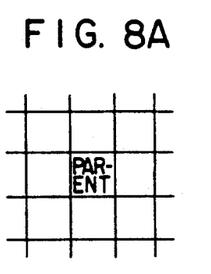
Figure 8B:
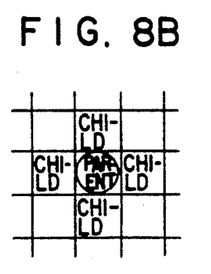
Figure 8C:
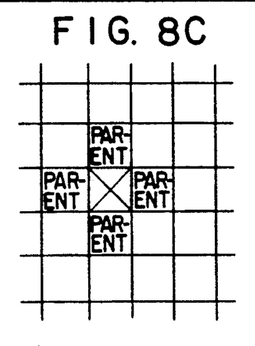
Figure 8D:
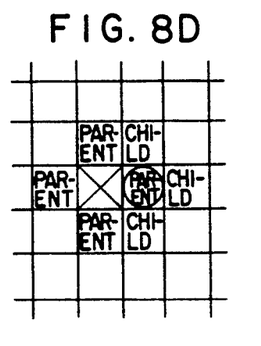
Figure 8E:
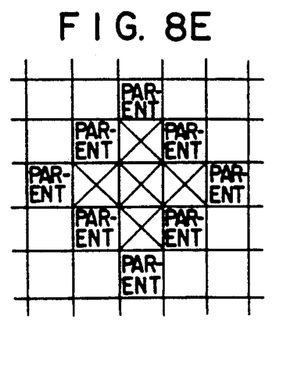

(The expression "pixels adjacent to a parent" signifies four pixels adjoining sides of a parent as shown in FIG. 7A when the region extraction is carried out in two-dimensional space and six pixels adjoining planes of a parent as shown in FIG. 7B when the region extraction is done in three-dimensional space.)

Step 115

It is evaluated whether the "pixels adjacent to a parent" taken out in the preceding step 114 can behave as "children". Behaving as "children" can be permitted when the following conditions are satisfied:

(1) The evaluation of the pixel was not done in the past (step 115)

(2) The expansion condition (local and global) is satisfied (step 116).

If behaving as "child" is permitted, the program proceeds to the following step 116 but if not permitted, the program jumps to step 118.

Step 116

The adjacent pixel is registered as a "child" in the "child" table.

Step 117

A point representative of the "child" is written in the extraction region storage memory (memory 12 in FIG. 1).

Step 118

If the evaluation of "pixels adjacent to a parent" is completed for all pixels, the program proceeds to the next step but if not, the program returns to step 114 where the "pixels adjacent to a parent" evaluation is done for another pixel.

Step 119

The "parent" which has been an object to be evaluated throughout the steps following step 113 is erased from the "parent table".

Step 120

The "parent table" is examined to determine whether a "parent" remains. If there is a remaining parent, the program returns to step 113 but if not, the program proceeds to the next step.

Step 121

The "child table" is examined to determine whether a "child" has been prepared. If not, the program ends.

Step 122

The contents of the "child table" are transferred to the "parent table". Namely, prepared "children" are all newly registered as "parents". Thereafter, the "child table" is initialized and the program again returns to step 113.

Modifications of the foregoing embodiment will now be described.

First modification

The extraction processing described in connection with the foregoing embodiment is effected for each internal organ and the results are stored as attribute information of a voxel (indicating which internal organ region the voxel belongs to) in the memory along with the density information.

Further, on the basis of the thus obtained attribute information of the voxel, each internal organ is selectively accessed and displayed.

Figure 9A:
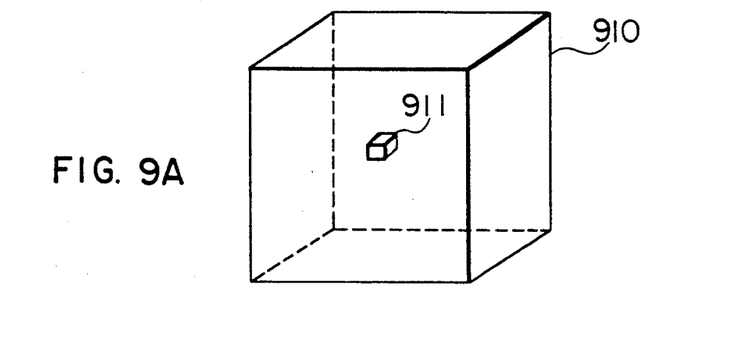
FIGS. 9A to 9F are diagrams showing examples of storage of voxel attribute information.

Conceivably, the attribute information of the voxel may be stored in various ways. Referring to FIG. 9A, a cube 910 is a three-dimensional array for storing the results of the extraction and a cube 911 is one of voxels within the array which stores data as to which region the corresponding pixel belongs to. Various kinds of the data and the manner of storing the data will now be described with reference to FIGS. 9B to 9F.

Figure 9B:
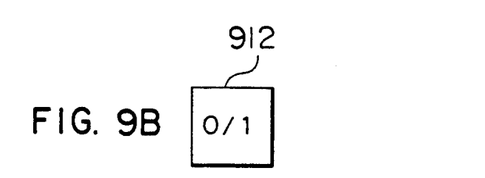

In FIG. 9B, the extraction results are represented by only information of bit 912 and only information about the interior/exterior of a region corresponding to an internal organ is stored.

Figure 9C:
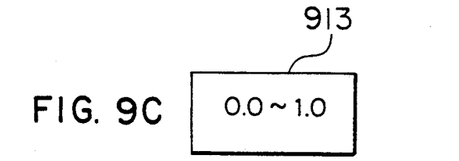

In FIG. 9C, the probability, as designated by 913, that a certain region may exist at a position of interest is available. When subjected to the three-dimensional display method such as volume rendering, this data may be used for imaging parts or tissues with reality.

Figure 9D:
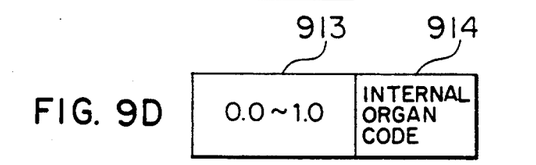

In FIG. 9D, the kind of each internal organ, which has been extracted, is represented by an internal organ code 914 and the probability of its existence 913 is available. A specified internal organ can be displayed by looking up its internal organ code.

Figure 9E:
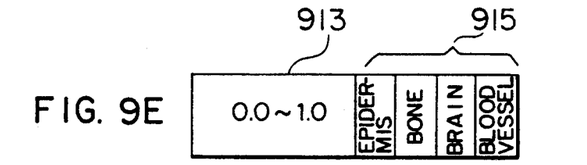

In FIG. 9E, there is available a field for storing the kind of internal organ as in the case of FIG. 9D but differently, the field of FIG. 9E has the form of a bit string 915. Individual bits indicate the presence or absence of individual internal organ. This format can designate an internal organ to be displayed through a simple bit operation and is therefore suitable for speed-up in the display system.

Figure 9F:
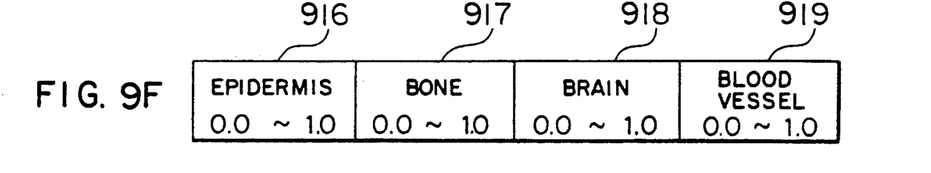

In FIG. 9F, the probability of existence 916, 917, 918 or 919 of each internal organ is available. Although the data length is prolonged, the format of FIG. 9F may be applied effectively to a region such as the boundary of internal organ in which it is not always determined definitely which region a voxel belongs to.

Second modification

Figure 10:
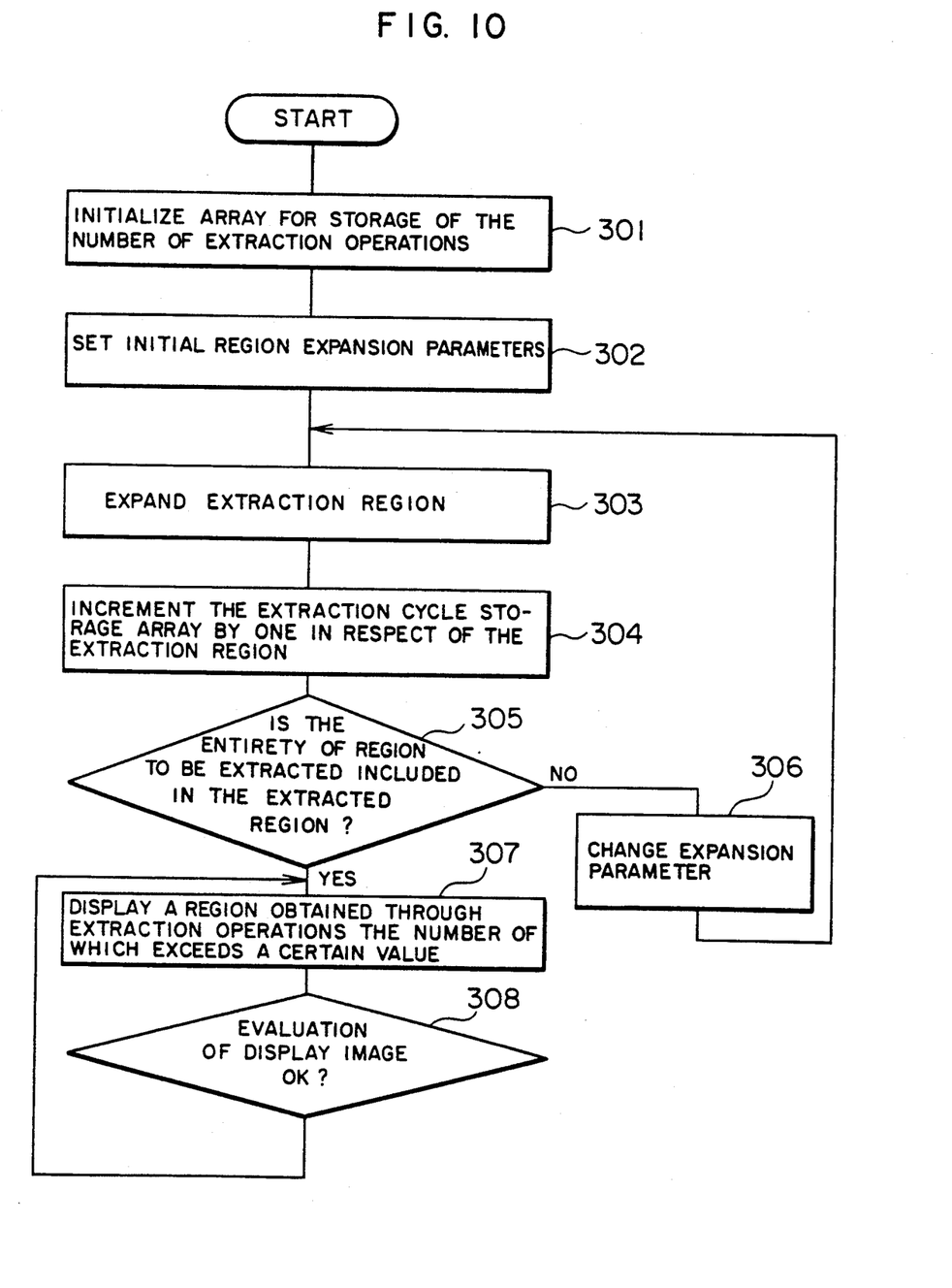
FIG. 10 is a flow chart of an example of application of the invention.

A modified embodiment wherein the method of the foregoing embodiment is carried out a plurality of times by using different parameters for respective cycles will be described with reference to a flow chart of FIG. 10.

Step 301

An array for storing the number of extraction operations is initialized.

Step 302

Local and global expansion conditions are set. In the present modification, the extraction processing is executed a plurality of times by relieving the conditions gradually. Thus, in order to avoid a region to be extracted from being included perfectly through the first cycle of extraction processing, parameters are so set as to make the expansion conditions slightly stringent.

Step 303

The region extraction processing is carried out in accordance with the method described in connection with the foregoing embodiment.

Step 304

The results of extraction obtained in step 303 correspond to part of the region to be extracted. The value of the extraction cycle count array is incremented by one.

Step 305

The results of extraction are examined. If the region to be extracted is completely included in the extraction results, the program proceeds to step 307 and the extraction cycle count array is evaluated. If part of the region to be extracted still remains, the program proceeds to the following step 306.

Step 306

The expansion parameter is changed to slightly relieve the expansion conditions and subsequently, the program again returns to step 303 to perform the extraction processing.

Step 307

A certain extraction region can be obtained by clamping the count array at an appropriate threshold value. By setting the threshold value properly while monitoring the extraction region on the display unit, the internal organ extraction can be performed with higher reliability.

Third modification

Figure 11A:
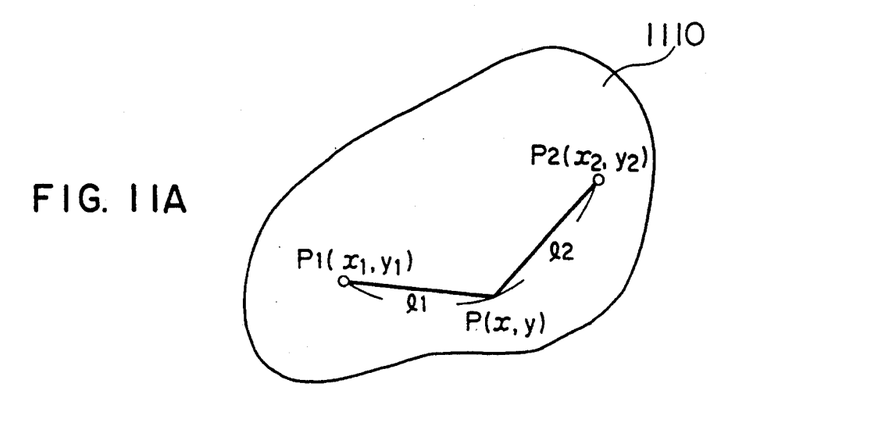
FIGS. 11A to 11C are diagrams useful in explaining an extracting method according to a modified embodiment of the invention wherein the constraint condition is changed in accordance with features of a region.
Figure 11B:
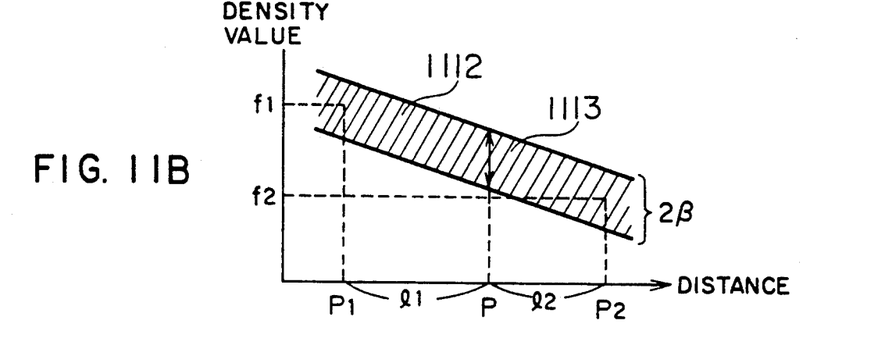
Figure 11C:
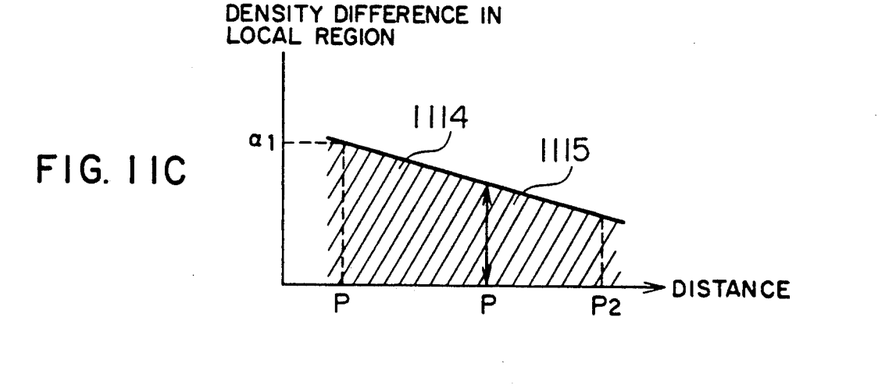

In the present modification, the region extraction is carried out while changing the expansion constraint conditions, which remain constant in the foregoing embodiment, in accordance with features of an object region. More specifically, local constraint condition and global constraint condition depending on values and position information for several sampling points set up in a region to be extracted are calculated and the region expansion is effected on the basis of these conditions. FIGS. 11A to 11C are useful to explain the method of the present modification.

Referring to FIG. 11A. $P1(x_1, y_1)$ and $P2(x_2, y_2)$ represent sampling points set up in an object region 1110 to be extracted and $P(x, y)$ represents a point (expanded point) being evaluated as to whether it falls within the present region.

At the expanded point P, the global constraint condition is given by the following formula:

$$|f - f_0| < \beta.$$

While in the foregoing embodiment $f_0$ always indicates the density value at the start point, that is, takes a constant value, $f_0$ in the present modification is calculated in respect of individual expanded points pursuant to the following formulas $$f_0 = \frac{l_2 f_1 + l_1 f_2}{l_1 + l_2},$$

$$l_1 = \sqrt{(x - x_1)^2 + (y - y_1)^2}$$

$$l_2 = \sqrt{(x - x_2)^2 + (y - y_2)^2}$$

where $f_1$ and $f_2$ represent density values at P1 and P2, respectively.

Referring to FIG. 11B, a hatched area 1112 indicates a density range within which the global expansion condition is satisfied. In the vicinity of the sampling point P1, the expansion condition is satisfied within a width range of 2 $\beta$ centered on $f_1$ but in the vicinity of the point P2, within a width range of 2 $\beta$ centered on $f_2$. At the expanded point P, the density range satisfying the expansion condition coincides with a line segment 1113 with arrows.

The local constraint condition at the expanded point P is given by the following formula:

$$|f_i - f_{i-1}| < \alpha.$$

The parameter $\alpha$ is constant in the foregoing embodiment but in the present modification it is calculated in respect of individual expanded points pursuant to the following formula:

$$\alpha = \frac{f_0}{f_i} \alpha_0$$

where $f_0$ is a value obtained at a point under the global expansion condition, and $\alpha_0$ is a local parameter standing for a criterion.

Referring to FIG. 11C, the ordinate represents the density difference between adjacent pixels and a hatched area 1114 indicates a range within which the local expansion condition is satisfied. In the vicinity of P1 at which the density value is high, the tolerance of the density difference becomes high but in the vicinity of P2 at which the density value is low, it becomes low. At the expanded point P, the expansion condition is satisfied within a range indicated by a line segment 1115.

Conventionally, the tissue extraction processing for a specified internal organ has been very laborious and time-consuming, but by using the present invention, most of the processing can be automated. Further, the method of the present invention has good compatibility with the volume rendering which is one of methods for three-dimensional display of voxel data and therefore a three-dimensional image of a specified internal organ can be prepared easily by applying the volume rendering to the results of extraction of the corresponding region. Especially, three-dimensional display of soft parts (for example, a cerebral cortex), conventionally difficult to achieve, can be ensured.

What is claimed is:

1. A computer implemented region extracting method wherein each of the following steps is performed by a computer:
   preparing multi-dimensional image data by combining two or more two-dimensional tomography image data sheets;
   detecting at least two kinds of features representative of a local change and a global change in a pixel value by using the multi-dimensional image data;
   calculating a composite feature which is a combination of said features;
   performing a region expansion by using said composite feature as a condition for expansion; and
   adding to a region obtained through said region expansion another region surrounding said region obtained through said region expansion.

2. The region extracting method according to claim 1, wherein said step of performing said region expansion includes selecting a representative pixel acting as a representative point of a region of interest, and sequentially expanding the region toward a pixel adjacent to said representative pixel by using said representative pixel as a start point of said region expansion.

3. The region extracting method according to claim 1, wherein said step of detecting said at least two kinds of features includes detecting said at least two kinds of features in a region of interest, and wherein said step of calculating said composite feature includes weighting said two kinds of features in accordance with characteristics of said region of interest, and adding together the weighted features.

4. The region extracting method according to claim 1, wherein said step of performing said region expansion includes defining, as said global change, a difference between an average of values of pixels in a vicinity of a start point of said region expansion and a value of a pixel subject to said region expansion, and using, as one of said at least two kinds of features, a fact that the difference falls within a predetermined range.

5. The region extracting method according to claim 1, wherein said step of performing said region expansion includes defining, as said local change, a change in value of a pixel inside a region in a vicinity of a point subject to said region expansion, and using, as one of said at least two kinds of features, a fact that said change in value falls within a predetermined range.

6. The region extracting method according to claim 1, wherein said step of performing said region expansion includes automatically setting coordinates of a start point for said region expansion and setting values for use in said detecting step and said calculating step in accordance with characteristics of an internal organ representing a region to be obtained by said region expansion.

7. The region extracting method according to claim 1, wherein said step of performing said region expansion includes performing said region expansion by changing local and global change constraint conditions in accordance with imaging conditions and characteristics of a region to be obtained by said region expansion.

8. The region extracting method according to claim 1, wherein said step of performing said region expansion includes executing extraction of a region of interest by said region expansion a plurality of times for the multi-dimensional image data by using at least two or more different local and global change constraint conditions in calculating said composite feature, and determining an ultimate range of said extraction of said region of interest based on the calculated composite feature.

9. The region extracting method according to claim 1, wherein said step of adding said region includes adding another region of one or more dots surrounding said region obtained through said region expansion to said region obtained through said region expansion, and weighting said another region in accordance with distances of said one or more dots from boundary of said region obtained through said region expansion.

10. The region extracting method according to claim 9, wherein said step of said another region and weighting said another region are effected by repeating a processing indicated by formulas as shown below when n-dimensional data is used:

$$g_1(x_1, x_2, \ldots, x_n) = 1$$
when $g_0(x_1, x_2, \ldots, x_n) = 1$ (inside the region)

-continued $$g_1(x_1, x_2, \ldots, x_n) = \frac{1}{3^n} \sum_{\Delta x_1 = -1}^{+1} \sum_{\Delta x_2 = -1}^{+1} \cdots \sum_{\Delta x_n = -1}^{+1} g_0(x_1 + \Delta x_1, x_2 + \Delta x_2, \ldots, x_n + \Delta x_n)$$
when $g_0(x_1, x_2, \ldots, x_n) = 0$ (outside the region)

where $g_0(x_1, x_2, \ldots, x_n)$ is image data obtained through said region expansion and is 1 (one) for an interior of the region and 0 (zero) for an exterior of the region.

11. The region extracting method according to claim 10, further comprising the step of multiplying said weighted another region by said multi-dimensional image data for individual pixels to reflect a density of an original image on said region obtained through said region expansion.

12. A computer implemented three-dimensional display method wherein each of the following steps is performed by a computer:
  extracting a specified region through region expansion by performing the substeps of
   preparing multi-dimensional image data by combining two or more two-dimensional tomography image data sheets,
   detecting at least two kinds of features representative of a local change and a global change in a pixel value by using the multi-dimensional image data,
   calculating a composite feature which is a combination of said features,
   performing a region expansion by using said composite feature as a condition for expansion, and
   adding to a region obtained through said region expansion another region surrounding said region obtained through said region expansion to obtain a specified region; and
  applying a three-dimensional image preparing method based on volume rendering to said specified region to construct a three-dimensional image.

13. The three-dimensional display method according to claim 12, wherein said substep of adding to a region obtained through said region expansion includes the substep of changing pixel values outside side region obtained through said region expansion based on data obtained through said region expansion.

14. The three-dimensional display method according to claim 12, wherein said substep of performing a region expansion and said substep of adding to a region obtained through said region expansion are carried out three-dimensionally.

* * * * *